C. JEWELL.

MOTOR STARTER.

APPLICATION FILED FEB. 28, 1913.

Reissued June 10, 1913.

13,573.

4 SHEETS—SHEET 1.

Witnesses

P. J. Gathmann

J. M. Spang Jr.

Inventor

Clay Jewell

By Foster Freeman Watson & Coit

Attorneys

C. JEWELL.

MOTOR STARTER.

APPLICATION FILED FEB. 28, 1913.

Reissued June 10, 1913. 13,573.

4 SHEETS—SHEET 2.

Witnesses

P. J. Gathmann

H. M. Spangler

Inventor

Clay Jewell

By Foster Freeman Watson & Coit

Attorneys

C. JEWELL.

MOTOR STARTER.

APPLICATION FILED FEB. 28, 1913.

Reissued June 10, 1913.

13,573.

4 SHEETS—SHEET 3.

Witnesses

P. J. Gathmann

H. M. Spangler

Inventor

Clay Jewell

By Foster Freeman Watson & Coit

Attorneys

C. JEWELL.

MOTOR STARTER.

APPLICATION FILED FEB. 28, 1913.

Reissued June 10, 1913. 13,573.

4 SHEETS—SHEET 4.

Witnesses

P. J. Gathmann

H. M. Spangler

Inventor

Clay Jewell

By Foster Freeman Watson & Coit

Attorneys

UNITED STATES PATENT OFFICE.

CLAY JEWELL, OF BALTIMORE, MARYLAND, ASSIGNOR TO THE JEWELL ELECTRIC COMPANY, OF BALTIMORE, MARYLAND, A CORPORATION OF MARYLAND.

MOTOR-STARTER.

13,573. Specification of Reissued Letters Patent. Reissued June 10, 1913.

Original No. 1,035,593, dated August 13, 1912, Serial No. 603,693. Application for reissue filed February 28, 1913. Serial No. 751,390.

*To all whom it may concern:*

Be it known that I, CLAY JEWELL, a citizen of the United States, and resident of Baltimore, Maryland, have invented certain new and useful Improvements in Motor-Starters, of which the following is a specification.

The object of the invention is to improve the construction and increase the efficiency of devices of this class.

Figure 1:
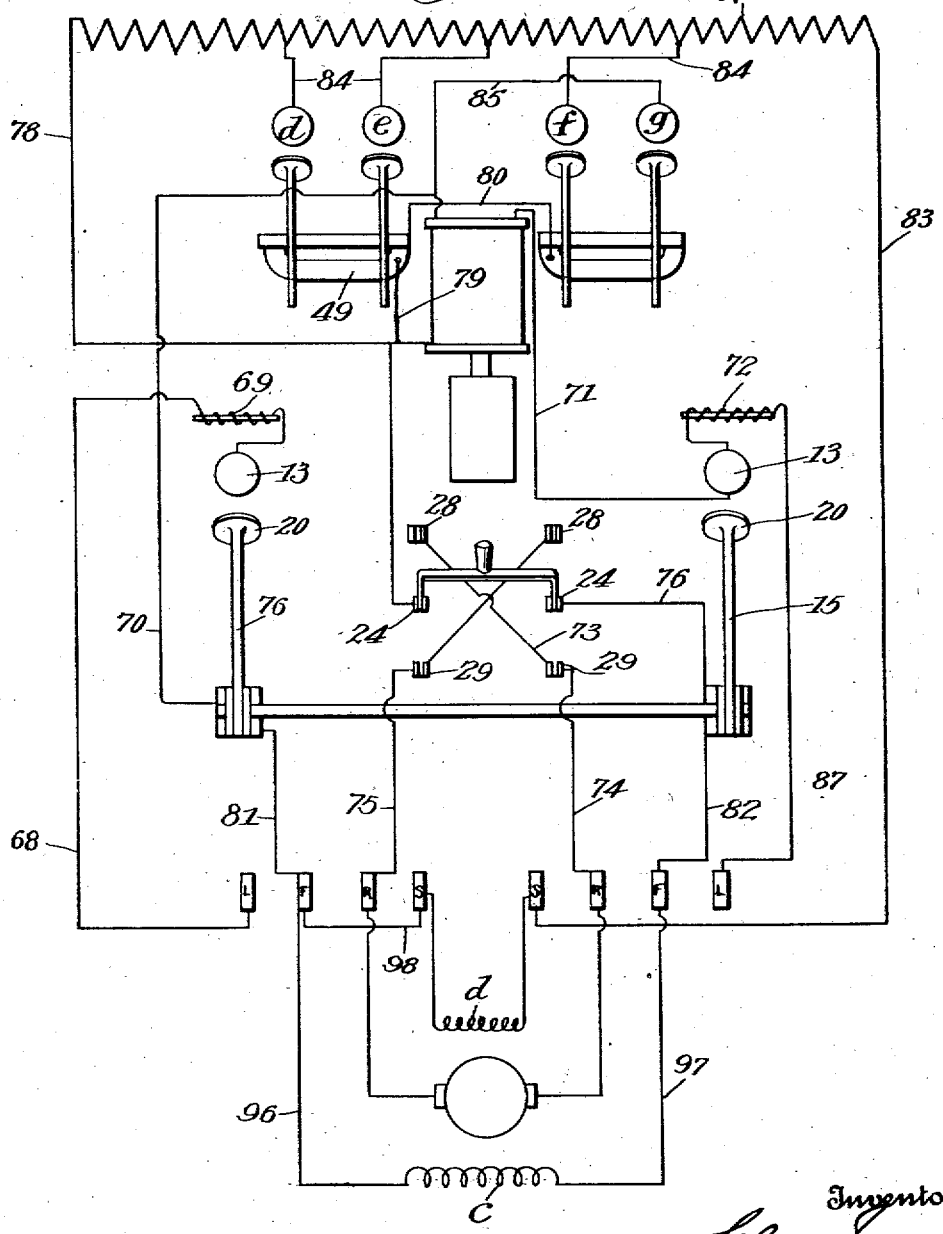
Figure 2:
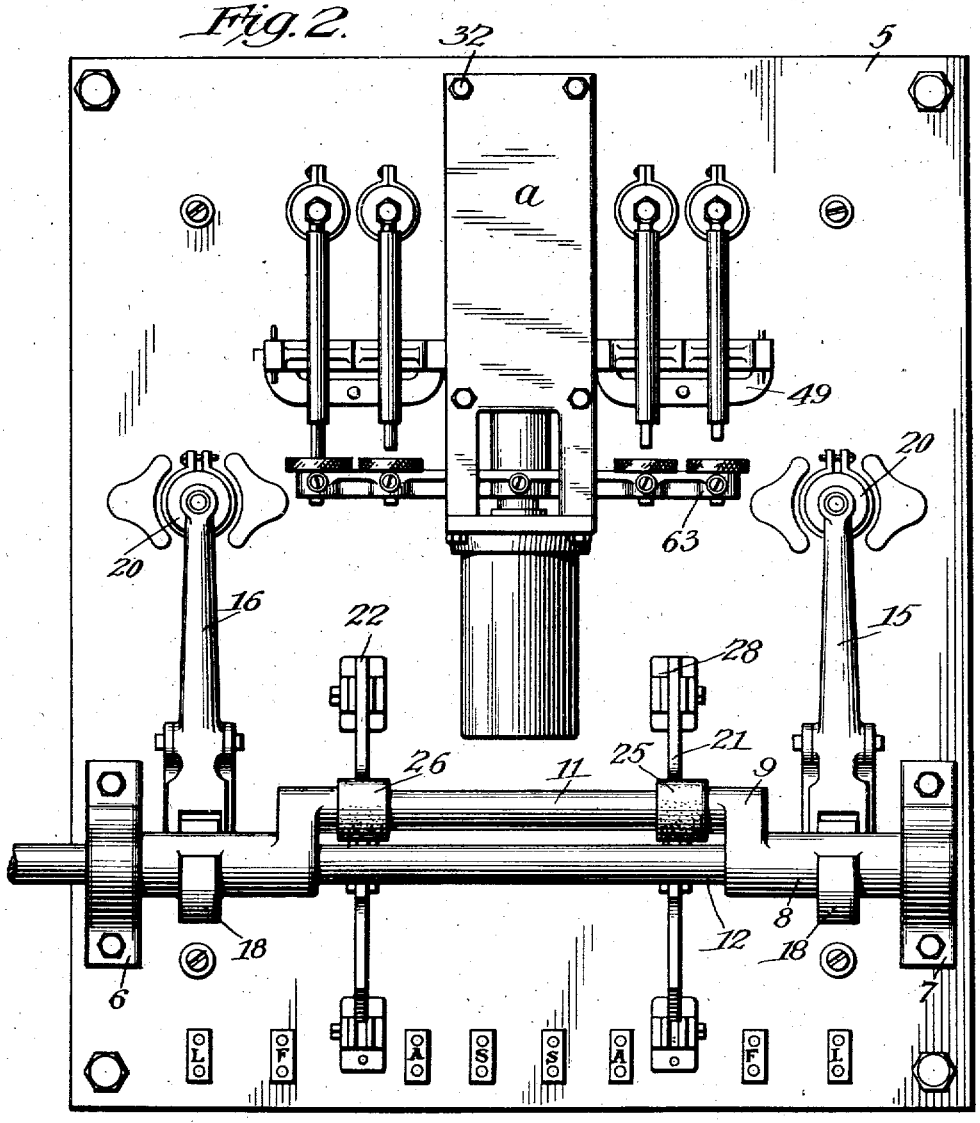
Figure 3:
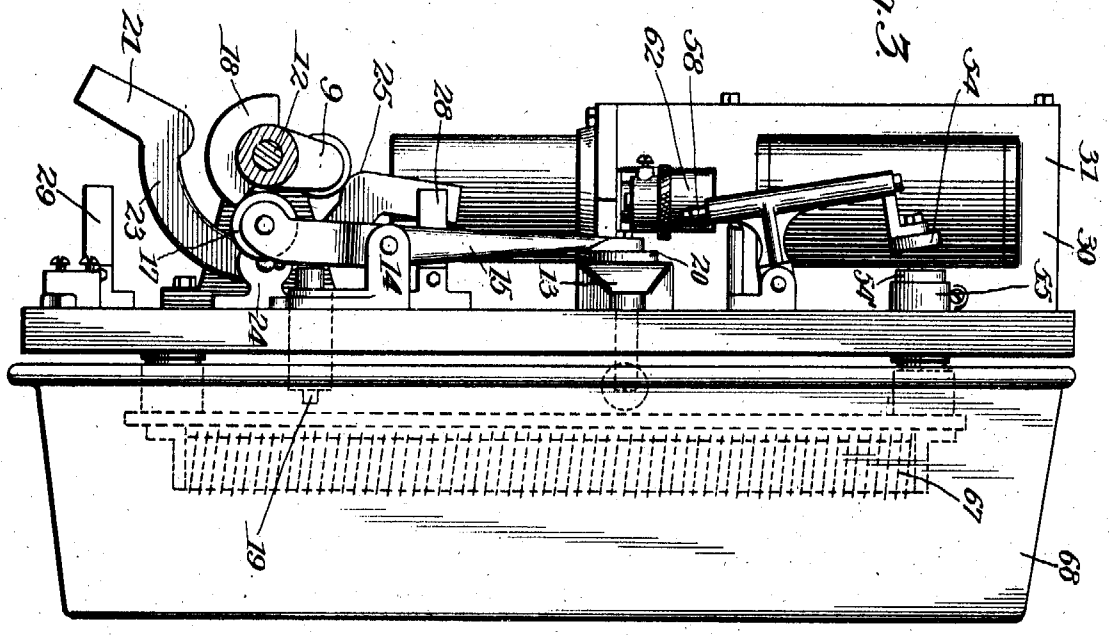
Figure 4:
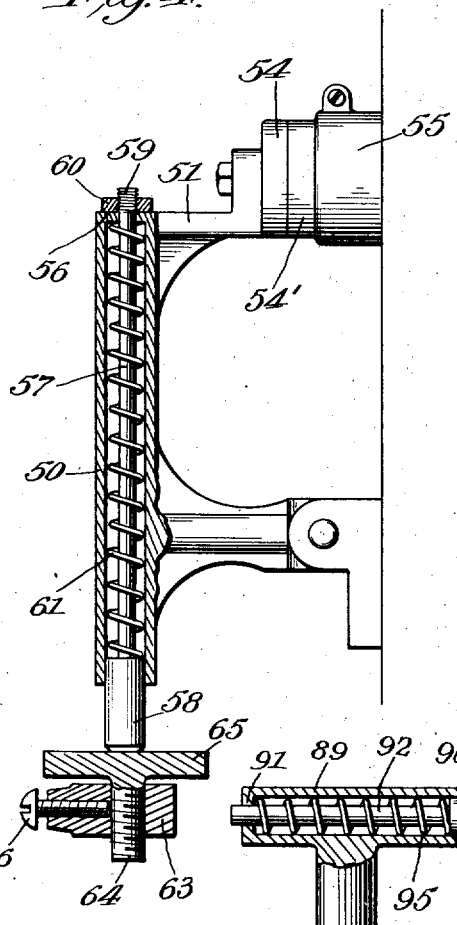
Figure 5:
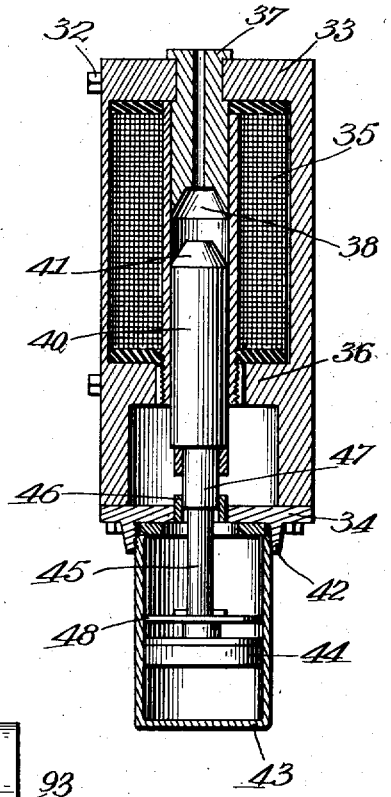
Figure 6:
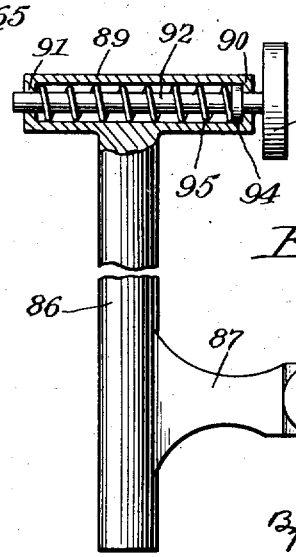

The various improvements will be understood from the following description taken in connection with the accompanying drawings, in which:

Figure 1 is a diagrammatic view showing the electrical connections employed; Fig. 2 is a front elevation of the device; Fig. 3 is a side view thereof; Fig. 4 is a detail of one of the switch members partly in section also showing the bar for actuating the same; Fig. 5 is a vertical section taken through the solenoid and dash-pot; Fig. 6 is a detail of a modified form of switch arm.

Similar numerals of reference are employed to designate corresponding parts throughout.

The switchboard 5 is provided on one face with bearings 6 and 7 which receive the shaft 8. A portion of the shaft 8 between the bearings 6 and 7 is offset as shown at 9 and 10, the portion connecting these offsets comprising a countershaft 11. Extending through the shaft 8 and parallel with the countershaft is an inner shaft 12, one end of which extends beyond one side of the switchboard (such extension not being here shown) and is adapted to connect to a suitable operating device not shown. Arranged on the switchboard are a pair of spaced contact blocks 13 and pivoted in brackets 14 located below the blocks 13 are levers 15 and 16. The lower ends of the levers extend between the shaft 8 and board 5 and are provided with rollers 17. Formed upon the opposite end portions of the shaft 8 and located between and adjacent to the bearings 6 and 7 are segmental cams 18. Sliding in openings in the board 5 and located directly below the pivotal points of the levers are pins 19, the outer ends of which are held in engagement with the inner sides of the levers by springs (not shown.) The pins serve to hold the contact pieces 20 at the upper ends of the levers in engagement with the blocks 13.

As shown in Fig. 3, when the offset portions 9 and 10 extend substantially vertically upward the inner ends of the segmental cams will underlie the rollers 17. When the countershaft 11 is moved outward and to a position at substantially right angles to that shown the cams 18 by engaging with the rollers 17 will move the lower ends of the levers inward, whereby the upper ends thereof will be out of engagement with the blocks 13. A reversing switch is provided which comprises a pair of switch blades 21 and 22 having arcuate-shaped medial portions 23 which are pivoted in brackets 24 located on the outer surface of the switchboard and between the brackets 14. Arranged on the opposite end portions of the countershaft 11 are fiber rollers 25 and 26. These fiber rollers engage with rounded surfaces 27 at the opposite ends of the arcuate-shaped portion 23 when the countershaft 11 is turned. By reference now to Figs. 2 and 3 it will be seen that when the offset portions 9 and 10 extend substantially vertically upward the upper end portions of the blades 21 and 22 will be forced into engagement with the upper contacts 28 arranged on the switchboard 5, and the lower end portions of the blades will be inclined downwardly and outwardly. When the countershaft is turned through an arc of substantially 180° the rollers thereof will have engaged with the rounded surfaces on the lower end portions of the blades and moved the said lower end portions into engagement with the lower contacts 29.

The solenoid *a* is of the iron-clad type and comprises a two-part casing, the parts of which are designated by the numerals 30 and 31. The parts 30 and 31 are bolted together and to the switchboard by bolts 32. The upper end of the casing is provided with an integral top 33 and the lower end is provided with a removable bottom 34. Arranged in the casing is a coil 35 supported at one end by an annular flange 36. The upper end of the coil bears on the top 33. The coil is provided with a stationary core 37 having a grooved portion extending through an opening in the top 33, the opposite sides of the groove bearing on the upper and lower faces of the top. The lower portion of the stationary core 37 is provided with a tapered seat 38. The movable core 40 has a tapered upper end 41 harbored by the seat 38. The lower surface of the bottom 34 is provided with an interiorly threaded bushing 42 which receives the exteriorly threaded upper end of a dash-pot cylinder 43. The plunger 44 of the dash-pot is of the ordinary type and is centrally provided with a stem or rod 45 extending through a bushing 46 and terminating in an enlarged cylindrical extension 47 which is connected or otherwise fixedly secured to the lower end of the movable core 40. The enlarged extension 47 is of a size to nicely fit in the bushing 46 and positioned on the rod 45 a short distance above the plunger 44 is a disk 48 serving as a deflector to prevent the oil or other liquid from splashing onto the coil when the plunger falls downwardly.

Arranged on the outer face of the switchboard and on opposite sides of the solenoid *a* are brackets *b*. These brackets are arranged in pairs, on either side of the casing, each pair being connected by a yoke 49. Pivotally connected to the brackets are a plurality of short circuiting bars, each of which includes a tubular portion 50 having at its opposite end portions lateral extensions 51 and 52. The extension 52 is pivoted to one of the brackets *b* by means of a pivot pin 53, and the free end portion of the extension 51 is provided with a contact block 54 adapted to engage with the block 54′ of a contact 55 carried by the switchboard. The upper end of the tubular portion 50 is provided with a head 56 having an opening, the function of which will presently appear. Arranged in the tubular portion 50 is a thrust pin comprising a shank 57 of a size to slidingly fit in the opening of the head 56, and terminating at one end in a head 58 of a size to slidingly fit in the tubular portion 50. The pin is somewhat greater in length than the length of the tubular portion 50 and the upper end portion of the shank thereof is screw-threaded as shown at 59 and engages the threads of a jam nut 60 which bears on the head 56 and thereby limits downward or outward movement of the head 58. By the provision of the threaded portion 59 and nut 60, the pin may be adjusted so that the head 58 thereof will extend to a required distance below the tubular portion 50. The head 58 is yieldingly held in projected position as shown in Figs. 2 to 4 by means of a thrust spring 61 surrounding the shank 57 and bearing on the inner end of the head 58 and head 56 respectively.

A bar 63 has an opening at its medial portion which receives the portion 47 of the core to which it is fixedly secured, the opposite end portions of the bar extend through oblong openings 62 in the sides of the casing and underlie the heads 58 of the pins. At points in alinement with the said heads the bar is provided with a plurality of spaced openings which receive the threaded shanks 64 of bearing plates 65. The bar is further provided with a plurality of openings arranged at right angles to the openings for the reception of the shanks, the said openings receive set screws 66, the inner ends of which bind on the shanks 64 and serve to lock the latter in any desired position of adjustment as clearly shown in Fig. 4.

As shown in Fig. 2 the lower ends of the heads 58 are different distances above the bearing plates 65, these various distances being obtained by means of the adjusting nuts 60. It will be further observed, by reference to Fig. 3, that the switch members by virtue of the blocks 54′ on the board 5 projecting beyond a vertical plane taken through the pivots 53 are overbalanced, whereby the contact portions of the short circuiting members will move outwardly and away from the contacts 55 when the force which moves them into such contact, is removed. Provision is made to limit the outward movement of the short circuiting members by providing suitable rule joints in the brackets *b*. With this construction it will be seen that when the coil of the solenoid is energized and the core thereof moves upwardly and carries with it the bar 63 the short circuiting members will be successively moved into engagement with the contact blocks 55 and when the bar moves to the position shown in Fig. 2 the short circuiting members will move outwardly by gravity, to the position shown in Fig. 3.

I am aware that it is not new to employ a dash-pot to retard the upward and downward movements of the core of a solenoid but heretofore so far as known the dash-pot has been arranged to one side of the solenoid casing and connection made between the plunger thereof and core of the solenoid through a link and lever connection. Practice has demonstrated that jamming or binding frequently results with the employment of a link and lever or their equivalents and, in order to overcome this defect I have provided the structure herein shown. It will be seen that owing to the disposition of the dash-pot and the positive connection between the plunger thereof and the core of the solenoid, downward movement of the plunger will be insured when the core of the solenoid is deënergized. Owing to the connection between the bearing plates 65 and the bar 63 and the adjustability of the pins of the short circuiting members relative adjustment of these parts may be effected whenever desired. The starting resistance coil 67 is located in a casing 68 secured in the rear face of the switchboard 5 as shown in Fig. 3.

In the modified form of short circuiting member illustrated in Fig. 6, an angular body portion has the arms 86 and 87 which are preferably of different lengths. The shorter arm 87 extends horizontally and is pivotally connected to a bracket 88 supported on the switchboard. The longer arm 86 supports a tubular portion 89 at its upper free end which is threaded at one end to receive an annular threaded cap 91 having a central opening therein. The other end of the tubular portion 89 has an internal flange 90 which leaves an opening in the end. The openings at the opposite ends of the tube are arranged in alinement to receive the shank 92 which carries the enlarged contact block 93 at its outer end. The shank 92 is provided with a collar 94 which is fitted thereon to slide in the tube 89 and engage against the flange 90 at the end of the tube. Surrounding the shank 92 there is a spiral thrust spring 95 which bears at one end against the cap 91 and at the opposite end against the collar 94 to yieldingly hold the contact block 93 in extended position as shown.

In Fig. 1 I have shown the ordinary circuit connections for an electric motor adapted to be operated in connection with the construction just described. In this case it will be seen that a conductor 68 from the main line connects with the contact block 13 on the left side of the switchboard; a suitable electro-magnetic blow-out 69 is provided for this block and located on the rear side of the board 5. When the contact blocks 20 of the levers bear on the blocks 13, the main circuit extends through the conductor 68, lever 16 and a conductor 70, which connects the lever with one terminal of the coil of the solenoid, through the said coil and a conductor 71 to the opposite side of the line. A suitable electromagnetic blow-out 72 is provided for the block 13 on the right of the switchboard in Figs. 1 and 2. The upper contacts 28 and lower contacts 29 of the reversing switch are cross connected by the usual cross wires 73 which are connected to the armature by means of conductors 74 and 75. The switch blade on the right is connected to the lever 15 by a conductor 76, and the opposite switch blade is connected to one terminal of the starting resistance coil 67 by conductors 77 and 78, the latter of which is terminally secured on the casing of the solenoid and connected to one of the yokes 49 of the brackets by a conductor 79. Electrical connection between the brackets is established through a conductor 80. The circuit through the shunt field $c$ is completed through the conductors 81 and 82 connected to the levers 16 and 15 respectively. The series field coil is connected to the resistance coil 67 by the conductor 83. The contact blocks $d'$, $e$ and $f$ in Fig. 1, which correspond to the blocks 54′ in Fig. 4 are connected to different points of the resistance coil by conductors 84, and the block $g$ is connected to the conductor 70 by a conductor 85. When the upper end portions of the switch blades are in engagement with the upper contacts 28 and the contacts of the levers 15 and 16 bear on the contacts 13 the path of the current will be through the conductor 68 and lever 16 where it divides for the purpose of exciting the field as is well known. The main circuit extends through the conductor 70, coil of the solenoid, and conductor 71, to the opposite side of the line. The shunt field circuit extends through conductor 96, shunt field coil $c$, and conductors 97 and 82, to opposite side of the line. The series field circuit extends through the conductor 98, series field coil $d$, conductor 83, resistance coil 67, conductors 78 and 77, one conductor 73 of the reversing switch, conductor 74, through the armature, conductor 75, the other conductor of the reversing switch and, by conductor 76 to opposite side of the line. When the first-operated short circuiting member is in engagement with the contact $d'$, it will be seen that a portion of the resistance 67 will be cut out, the current then passes through the conductor 83, short circuiting member and conductors 79 and 77 and through the armature, in the manner before described. It will be further observed that when the last operated short circuiting member is in engagement with the contact $g$ the resistance 67 and series field coil $d$ will be completely cut out. It will be further observed that when the lower end portions of the switch blades are in engagement with the lower contacts 29, 29 the path of the current through the armature will be changed, thus reversing the rotation of the armature.

Although I have not shown a means for operating the controller shaft it is to be understood that in use this shaft will extend beyond one end of the switchboard and have connected thereto a pulley, lever or other suitable operating means.

Having thus described the invention, what I claim as new and desire to secure by Letters Patent, is:

1. In a motor starter, the combination of a starting resistance, a plurality of contact blocks electrically connected with different points in said resistance, a series of pivotally mounted yieldable and longitudinally adjustable short circuiting members, means for moving the said members into engagement with said blocks, and means for retarding the movement of the first-mentioned means.

2. In a motor starter, the combination of a starting resistance, a plurality of contact blocks electrically connected with different points in said resistance, a series of pivotally mounted and electrically connected short circuiting members provided with movable pins, and means for engaging said pins to move said members, for the purpose described.

3. In a motor starter, the combination of a starting resistance, a plurality of contact blocks electrically connected with different points in said resistance, a series of independently movable and electrically connected short circuiting members having adjustable pins, means for engaging said pins to move said members, and retarding means for said pin engaging means.

4. In a motor starter, the combination of a starting resistance, a plurality of contact blocks electrically connected with different points in said resistance, a series of pivotally mounted and electrically connected short circuiting members provided with adjustable and yieldingly held pins, and means for engaging said pins to move said members, for the purpose described.

5. In a motor starter, the combination of a starting resistance, a plurality of contact blocks electrically connected with different points in said resistance, a series of pivoted and electrically connected short circuiting members provided with adjustable and yieldingly held pins, and adjustable means for moving said members, for the purpose described.

6. In a motor starter, the combination of a starting resistance, a plurality of contact blocks electrically connected with different points in said resistance, a series of pivoted and electrically connected short circuiting members provided with adjustable and yieldingly held pins, adjustable means for moving said members, and means for retarding the movement of the first-mentioned means.

7. In an automatic starter, the combination with a plurality of movable contact members, of vertically adjustable means for moving the contact members, electro-magnetic means for causing movement of said adjustable means into engagement with said contact members, and a retarding mechanism for said adjustable means connected directly to said electro-magnetic means.

8. In a motor starter, in combination, a pivoted contact member, a solenoid, a bar connected to the core of the solenoid provided with an adjustable bearing plate for moving the contact member, and a retarding device for the bar connected directly to said core.

9. In an automatic starter, the combination with a plurality of pivoted contact members, of adjustable reciprocating means for moving the contact members, electromagnetic means for causing the movement of said reciprocating means into engagement with said contact members and a retarding mechanism for the reciprocating means connected directly to said electromagnetic means.

10. In an automatic starter, the combination with a plurality of pivoted contact members provided with movable pins, of adjustable reciprocating means for moving the contact members, and means for causing the movement of said reciprocating means into engagement with said pins on the contact members.

11. In an automatic starter, the combination with a starting resistance, of a plurality of contact blocks electrically connected with different points in said resistance, a plurality of contact members provided with movable pins, reciprocating means for moving the contact members, and means for causing the movement of said reciprocating means into engagement with the pins on the contact members to move said members into engagement with the contact blocks.

12. In an automatic starter, the combination with a plurality of contact members, of reciprocating means for moving the contact members, and adjustable means carried by the contact members for cushioning the thrust of the reciprocating means.

13. In an automatic starter, the combination with a plurality of contact members, of means for operating the contact members, electromagnetic means for actuating the operating means, and means on the contact members engageable by the operating means to cushion the thrust of the latter.

14. In an automatic starter, the combination with a plurality of pivoted contact members, of reciprocating means for moving the contact members, means for actuating the reciprocating means, and means on the pivotally mounted contact members adapted to cushion the thrust of and be engaged by the reciprocating means.

15. In an automatic starter, the combination with a contact member, of means for actuating the contact member, the contact member comprising a tubular portion, and means carried by the tubular portion and engaged by the actuating means to move the contact member.

16. In an automatic starter, the combination with a plurality of contact members, of means for moving the contact members, the contact members each comprising a tubular portion, yieldingly held means on the tubular portion and adapted to be engaged by said moving means to operate the contact members.

17. In an automatic starter, the combination with a contact member, of means for moving the contact member, means for actuating said moving means, each contact member comprising a tubular portion, an adjustable means slidable in the tubular portion and adapted to be engaged by said moving means to operate the contact member associated therewith.

18. In a motor starter, the combination of a starting resistance, contact blocks electrically connected with different points in said resistance, a plurality of short circuiting members, means for actuating said short circuiting members, each of said members comprising a tubular portion, an adjustable and yieldingly held means movable on the tubular portion and adapted to be engaged by the actuating means to operate the short circuiting member.

19. In a motor starter, the combination of a starting resistance, contact blocks electrically connected with different points in said resistance, a plurality of pivoted short circuiting members, each comprising a tubular portion, an adjustable and yieldingly held means movable on the tubular portion, and means for actuating the short circuiting member and adapted to engage the adjustable and yieldable means to be cushioned thereby.

20. In an automatic starter, the combination with a starting resistance, of a plurality of contact blocks electrically connected with different points in said resistance, a plurality of short circuiting members, each comprising a tubular portion, a yieldingly held means carried by the tubular portion, and means for actuating said short circuiting members.

21. In an automatic starter, the combination with a starting resistance, of a plurality of contact blocks electrically connected with different points in said resistance, a plurality of pivoted short circuiting members, each comprising a tubular portion, a yieldingly held member slidable in the tubular portion, and reciprocating means for actuating the short circuiting members.

22. In an automatic starter, the combination with a starting resistance, of a plurality of contact blocks electrically connected with different points in said resistance, a plurality of pivoted contact members, adjustable reciprocating means for moving the contact members, and means for causing the movement of said reciprocating means into engagement with the contact members to move the latter into engagement with said contact blocks.

23. In a motor starter, the combination with a plurality of short circuiting contact members having direct electrical connection with one another, of bodily reciprocating means for successively moving the contact members, and cushioning means for cushioning the thrust of the reciprocating means upon the contact members.

24. In a motor starter, the combination of a resistance, a contact member associated with the resistance, means for engaging and moving the contact member, the latter being adapted to short circuit a part of the resistance, cushioning and adjusting means between the moving means and contact member arranged to cushion the thrust of the moving means and to permit the relation of the latter and the member which it engages to be varied.

25. In a motor starter, the combination of a plurality of independently movable contact members having direct electrical connection with one another, means normally out of contact therewith for operating the contact members, electro-magnetic means for actuating the operating means, and cushioning means for cushioning the thrust of the operating means when the latter engages the contact members.

26. In a motor starter, the combination with a contact member, of a reciprocating member for actuating the contact member and independent of the latter, one of said members having a cushioning device for contacting with the other, for the purpose set forth.

27. In a motor starter, the combination with a contact member, of a reciprocating member for actuating the contact member, said members being normally disengaged and one of said members having a tubular portion and a cushioning device mounted in said tubular portion for contacting with the other member, for the purpose set forth.

28. In a motor starter, the combination with a plurality of contact members, of means for moving the contact members, said means and members being normally disengaged and cushioning means between the said moving means and the contact members.

29. In a motor starter, the combination with a plurality of independently movable contact members, of means for moving the contact members and cushioning means between the said moving means and the contact members, the said cushioning means comprising tubes and spring plungers mounted therein.

30. In a motor starter, in combination a starting resistance, a plurality of contact blocks electrically connected with different points in said resistance, a series of pivotally mounted short-circuiting members, reciprocating means adapted to move said members successively, and cushioning means between the moving means and the short-circuiting members.

31. In a motor starter, the combination with a plurality of pivoted contact members, of a solenoid, a bar connected to the core of the solenoid, the said bar being adapted to operate the contact members, and yieldable actuating means between the bar and the contact members.

32. In a motor starter, the combination with a plurality of pivoted contact members, of a solenoid, a bar connected to the core of the solenoid, the said bar being adapted to operate the contact members, actuating means between the bar and the contact members, and means for adjusting the connections between the bar and the contacts of the contact members.

33. In a motor starter, the combination of a starting resistance, a series of contact blocks connected with different points in said resistance, a series of independently movable and electrically connected short circuiting members adapted to coöperate with the blocks, and means for actuating said members comprising telescoping elements and yieldable means associated therewith.

34. In a motor starter, the combination of a resistance, contact blocks electrically connected with different points in the resistance, short-circuiting means comprising members normally electrically disconnected from said blocks and adapted when actuated to coöperate with the blocks to short-circuit the resistance, and means for actuating the short circuiting means, one of said means being provided with a cushioning device adapted to engage the other means.

35. In a motor starter, the combination of a resistance, a plurality of independently movable short-circuiting members electrically connected with one another and with only one end of said resistance, and means normally disconnected from the members for successively operating said members to gradually short-circuit said resistance, and means for cushioning the thrust of the operating means upon the members.

36. In a motor starter, the combination of a suitable supporting panel, a starting resistance, contacts on the panel electrically connected with different points of the resistance, a pair of brackets mounted on the panel, short-circuiting members supported on the brackets, circuit closers on the panel, and means including a shaft for operating the short-circuiting members and circuit closers.

37. In a motor starter, the combination of a suitable supporting panel, a starting resistance, contact blocks on the panel electrically connected with different points of the resistance, a pair of brackets electrically connected, short-circuiting members supported on the brackets so as to be independently movable, circuit closing and current reversing devices supported on the panel, and means including a shaft and telescopic means for actuating the short-circuiting members, and circuit closing and current reversing devices.

38. In a motor starter, the combination of a suitable supporting panel, brackets thereon, short-circuiting members pivotally mounted on the brackets, operating means for the short-circuiting members comprising a rod and plunger supported independently of the brackets and working in alinement with one another and along a line between the brackets.

39. In a motor starter, the combination of a suitable supporting panel, a starting resistance, members mounted on the panel and adapted to successively short-circuit sections of the resistance, main circuit closers mounted on the panel, and means for actuating the short-circuiting members and the circuit closers, said means including a bar and a rod operatively connected together.

40. In a motor starter, the combination of a suitable supporting panel, a resistance, contacts on the panel connected with different points of said resistance, a pair of brackets mounted on the panel, short-circuiting members supported on the brackets and electrically connected with one another, means for actuating the short-circuiting members to move the latter into engagement with the contacts, said means including an operating device working along a line between the brackets, and a device connected with the operating device and adapted to successively engage the short-circuiting members.

41. In a motor starter, the combination of a suitable panel, a starting resistance, a series of short-circuiting members adapted to gradually cut out the said resistance, main circuit closers, brackets on the panel for pivotally supporting the short-circuiting members and main circuit closers, and means for actuating the short-circuiting members and circuit closers, said means having a part which works between the brackets supporting the short-circuiting members.

42. In a motor starter, the combination of a suitable supporting panel, a starting resistance, members pivoted on the panel and adapted to successively short-circuit sections of the resistance, main circuit closers mounted on the panel, and means for actuating the short-circuiting members and the circuit closers, said means including a bar having parts adapted to engage the pivoted short-circuiting members to move the same, and an element connected to the bar and movable therewith.

43. In a motor starter, the combination of a suitable supporting panel, separate brackets supported on the panel, a starting resistance, contact blocks secured to the panel adjacent the one edge of the panel, short-circuiting members coöperating with the contact blocks and pivotally supported in said brackets, said brackets and short-circuiting members being electrically connected together, main circuit closers pivoted on the panel, and means for actuating the circuit closers and short-circuiting members, said means comprising a rotatable shaft, a rod, a bar connected to move with the rod and devices on said bar for engaging the short-circuiting members to move the same.

In testimony whereof I affix my signature in presence of two witnesses.

CLAY JEWELL.

Witnesses:
JOHN G. STOCK,
THOMAS S. MOONEY.